(12) United States Patent
Zhang et al.

(10) Patent No.: US 12,253,626 B2
(45) Date of Patent: Mar. 18, 2025

(54) INDOOR NON-CONTACT HUMAN ACTIVITY RECOGNITION METHOD AND SYSTEM

(71) Applicant: NANJING UNIVERSITY OF POSTS AND TELECOMMUNICATIONS, Nanjing (CN)

(72) Inventors: Dengyin Zhang, Nanjing (CN); Yan Yang, Nanjing (CN); Yepeng Xu, Nanjing (CN); Chenghui Qi, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 412 days.

(21) Appl. No.: 17/827,510

(22) Filed: May 27, 2022

(65) Prior Publication Data

US 2023/0055065 A1    Feb. 23, 2023

Related U.S. Application Data

(63) Continuation of application No. PCT/CN2022/086886, filed on Apr. 14, 2022.

(30) Foreign Application Priority Data

Aug. 6, 2021   (CN) .......................... 202110900089.7

(51) Int. Cl.
*G01S 7/41*     (2006.01)
*G01S 13/02*    (2006.01)
(Continued)

(52) U.S. Cl.
CPC .............. *G01S 7/415* (2013.01); *G01S 13/02* (2013.01); *G06N 3/04* (2013.01); *G06N 3/08* (2013.01)

(58) Field of Classification Search
CPC .......... G01S 7/415; G01S 13/02; G06N 3/04; G06N 3/08
See application file for complete search history.

(56) References Cited

U.S. PATENT DOCUMENTS 11,087,883 B1 *   8/2021   Narayanan ............. G06N 20/00
2020/0125852 A1 * 4/2020   Carreira ................. G06N 3/049
(Continued)

FOREIGN PATENT DOCUMENTS

CN     109522949 A  *  3/2019   .......... G06K 9/6267
CN     110855382 A  *  2/2020
(Continued)

OTHER PUBLICATIONS

M. Gholamrezaii and S. M. Taghi Almodarresi, "Human Activity Recognition Using 2D Convolutional Neural Networks," 2019 27th Iranian Conference on Electrical Engineering (ICEE), Yazd, Iran, 2019, pp. 1682-1686, doi: 10.1109 (Year: 2019).*

(Continued)

*Primary Examiner* — Vladimir Magloire
*Assistant Examiner* — Noah Yi Min Zhu

(57) ABSTRACT

Disclosed are an indoor non-contact human activity recognition method and system. The method comprises: collecting an indoor reflected signal by using an antenna array; filtering the reflected signal to obtain a noise-removed reflection signal; and inputting the noise-removed reflected signal to a pre-trained human activity recognition model, and determining a human activity category, the human activity recognition model being a pre-trained CNN network model based on a transfer learning algorithm. The recognition method and system have the advantages that: the antenna array is configured for collecting human actions to carry out activity recognition indoors, which can be applied to home-based care scenes; original data is denoised, so that most of high-frequency noises can be removed, and a phase (Continued)

change of the signal is reserved; a CNN structure is adopted for training so as to reduce a complexity of the system location-free sensing.

4 Claims, 3 Drawing Sheets

(51) Int. Cl.
  *G06N 3/04* (2023.01)
  *G06N 3/08* (2023.01)

(56) References Cited

U.S. PATENT DOCUMENTS

| | | | |
|---|---|---|---|
| 2020/0387755 A1* | 12/2020 | Hagen | G06F 18/2155 |
| 2021/0041548 A1* | 2/2021 | Chen | G01S 13/003 |
| 2021/0073525 A1* | 3/2021 | Weinzaepfel | G06V 10/82 |
| 2022/0328064 A1* | 10/2022 | Shriberg | G10L 25/66 |
| 2022/0374684 A1* | 11/2022 | Syngal | G06N 3/084 |

FOREIGN PATENT DOCUMENTS

| | | | | |
|---|---|---|---|---|
| CN | 110991559 A | * | 4/2020 | G06K 9/00335 |
| CN | 111091527 A | * | 5/2020 | G06T 7/0012 |
| CN | 111310621 A | * | 6/2020 | G06F 18/214 |
| CN | 111797804 A | * | 10/2020 | |
| CN | 112036433 A | * | 12/2020 | G06K 9/00516 |
| CN | 112330924 A | * | 2/2021 | G08B 21/043 |
| CN | 109670434 B | * | 9/2022 | G06K 9/00369 |
| CN | 111460901 B | * | 5/2023 | G06F 18/214 |
| WO | WO-2021051987 A1 | * | 3/2021 | G06N 3/0454 |

OTHER PUBLICATIONS

Dziugaite, Gintare Karolina, Daniel M. Roy, and Zoubin Ghahramani. "Training generative neural networks via maximum mean discrepancy optimization." arXiv preprint arXiv:1505.03906 (2015). (Year: 2015).*

Written Opinion of the International Searching Authority, PCT/CN2022/086886, Jun. 22, 2022 (Year: 2022).*

International Search Report, PCT/CN2022/086886, Jun. 22, 2022 (Year: 2022).*

* cited by examiner

FIG. 3

INDOOR NON-CONTACT HUMAN ACTIVITY RECOGNITION METHOD AND SYSTEM

CROSS-REFERENCE TO RELATED APPLICATIONS

This application is a continuation of International Patent Application No. PCT/CN2022/086886 with a filing date of Apr. 14, 2022, designating the United States, and further claims priority to Chinese Patent Application No. 202110900089.7 with a filing date of Aug. 6, 2021. The content of the aforementioned applications, including any intervening amendments thereto, are incorporated herein by reference.

TECHNICAL FIELD

The present invention relates to an indoor non-contact human activity recognition method and system, and belongs to the field of information technologies.

BACKGROUND

Realizing high-level human-computer interaction is a development direction in the future. Accurate sensing and understanding of a human behavior is an essential technical support. Traditional human behavior recognition is carried out by various sensors, such as a physical sensor and a camera. In recent years, with the rapid development of wireless network, a function of a radio frequency signal has been expanded from a single communication medium to a non-invasive environmental sensing tool, and carrying out human behavior recognition by using a wireless signal relieves a wearing restriction on a user, thus having a broad development prospect.

The basic principle is that a radio frequency signal is propagated in a wireless medium through multiple paths, reflects different objects and reaches a receiver, so that the radio frequency signal carries environment-related information. A human body is a good reflector, and by analyzing a pattern and a feature of the received radio frequency signal, a human activity and behavior, such as a respiration rate, a gesture and a falling down posture, may be detected. In recent years, widely concerned deep learning has been successfully applied to various fields, such as speech recognition and graphic recognition, and has achieved remarkable results in feature extraction. A feature is extracted from a wireless signal in an indoor environment through the deep learning, so that the human activity may be recognized.

However, if a model is trained with redundant data, over-fitting may be caused, and if the feature is too single, imprecise recognition is caused. In addition, it takes a lot of time costs to process a large amount of data at the same time and use the data for training. In practical application, how to realize high-precision recognition by using as few samples as possible is a challenging key problem.

SUMMARY

The technical problem to be solved by the present invention is to overcome the defects in the prior art, and provide an indoor non-contact human activity recognition method and system.

In order to solve the technical problem above, the present invention provides an indoor non-contact human activity recognition method, comprising the following steps of:

collecting an indoor reflected signal by using an antenna array;

filtering the reflected signal to obtain a noise-removed reflection signal; and inputting the noise-removed reflected signal to a pre-trained human activity recognition model, and determining a human activity category, the human activity recognition model being a pre-trained CNN network model based on a transfer learning algorithm.

Further, the reflected signal is filtered by principal component analysis to obtain the noise-removed reflection signal, and the noise-removed reflected signal is inputted to the pre-trained human activity recognition model.

Further, the filtering the reflected signal by principal component analysis comprises:

dividing an indoor activity space into a plurality of position areas, collecting a data packet of a fixed-time reflected signal of each activity in each position area, and removing a static path part in the data packet of the fixed-time reflected signal of each activity (indoor furniture and other static reflected signals corresponding to the static path part);

cutting the data packet of the fixed-time reflected signal of each activity with the static path part removed into a plurality of time slots with a fixed time duration, and forming a matrix H corresponding to the activity according to all the time slots;

obtaining a covariance matrix $H^T \times H$ according to the matrix H, and calculating a correlation matrix of the covariance matrix $H^T \times H$, wherein the correlation matrix is composed of correlation coefficients of the covariance matrix, a size of the correlation matrix is N×N, and N is a number of data streams;

carrying out feature decomposition on the obtained correlation matrix, and calculating to obtain a feature vector; and carrying out signal reconstruction according to a formula $h_a = H \times q_a$ to obtain the noise-removed reflected signal, wherein $q_a$ is an $a^{th}$ feature vector, and $h_a$ is an $a^{th}$ principal component.

Further, a training process of the human activity recognition model comprises:

acquiring a pre-built CNN model, wherein a structure of the CNN model comprises a plurality of convolutional layers, a pooling layer and one fully connected layer, the convolutional layers are sequentially connected through the pooling layer, and the last convolutional layer is connected with the fully connected layer through the pooling layer;

determining an appropriate training position according to a conclusion that adjacent positions have similar statistical features and a result of a maximum mean difference, and acquiring the noise-removed reflected signal at the training position to form an initial training data set;

training the CNN model with the initial training data set to obtain initial optimal model parameters;

initializing the CNN model with the initial optimal model parameters;

acquiring the noise-removed reflected signal at an inappropriate training position to form a secondary training data set; and freezing parameters of the convolutional layer and the pooling layer before the fully connected layer, and then training the fully connected layer with the secondary training data set until an upper limit of iteration times or a preset precision is reached, so as to obtain the trained human activity recognition model.

An indoor non-contact human activity recognition system, comprising:
a collecting module configured for collecting an indoor reflected signal by using an antenna array;
a filtering module configured for filtering the reflected signal to obtain a noise-removed reflection signal; and
a processing module configured for inputting the noise-removed reflected signal to a pre-trained human activity recognition model, and determining a human activity category, the human activity recognition model being a pre-trained CNN network model based on a transfer learning algorithm.

Further, the filtering module is configured for filtering the reflected signal by principal component analysis to obtain the noise-removed reflection signal.

Further, the filtering module comprises:
a division module configured for dividing an indoor activity space into a plurality of position areas, collecting a data packet of a fixed-time reflected signal of each activity in each position area, and removing a static path part in the data packet of the fixed-time reflected signal of each activity (indoor furniture and other static reflected signals corresponding to the static path part);
a cutting module configured for cutting the data packet of the fixed-time reflected signal of each activity with the static path part removed into a plurality of time slots with a fixed time duration, and forming a matrix H corresponding to the activity according to all the time slots;
a first calculating module configured for obtaining a covariance matrix $H^T \times H$ according to the matrix H, and calculating a correlation matrix of the covariance matrix $H^T \times H$, wherein the correlation matrix is composed of correlation coefficients of the covariance matrix, a size of the correlation matrix is N×N, and N is a number of data streams;
a second calculating module configured for carrying out feature decomposition on the obtained correlation matrix, and calculating to obtain a feature vector; and
a reconstruction module configured for carrying out signal reconstruction according to a formula $h_a = H \times q_a$ to obtain the noise-removed reflected signal, wherein $q_a$ is an $a^{th}$ feature vector, and $h_a$ is an $a^{th}$ principal component.

Further, the processing module comprises a model training module configured for:
acquiring a pre-built CNN model, wherein a structure of the CNN model comprises a plurality of convolutional layers, a pooling layer and one fully connected layer, the convolutional layers are sequentially connected through the pooling layer, and the last convolutional layer is connected with the fully connected layer through the pooling layer;
determining an appropriate training position according to a conclusion that adjacent positions have similar statistical features and a result of a maximum mean difference, and acquiring the noise-removed reflected signal at the training position to form an initial training data set;
training the CNN model with the initial training data set to obtain initial optimal model parameters;
initializing the CNN model with the initial optimal model parameters;
acquiring the noise-removed reflected signal at an inappropriate training position to form a secondary training data set; and
freezing parameters of the convolutional layer and the pooling layer before the fully connected layer, and then training the fully connected layer with the secondary training data set until an upper limit of iteration times or a preset precision is reached, so as to obtain the human activity recognition model.

The present invention achieves the beneficial effects as follows:
the antenna array is configured for collecting human actions to carry out activity recognition indoors, which can be applied to home-based care scenes; original data is denoised by principal component analysis, so that most of high-frequency noises can be removed, and a phase change of the signal is reserved; a simple CNN structure is adopted for training so as to reduce a complexity of the system, and meanwhile, the idea of transfer learning is utilized to endow the system with an ability of independent learning, and knowledge obtained from one position can be used in other positions. Finally, an object of realizing high-precision location-free sensing by using as little data as possible is achieved.

BRIEF DESCRIPTION OF THE DRAWINGS

FIG. 3 is a diagram of indoor position division when the method of the present invention is implemented; and

DETAILED DESCRIPTION

Figure 1:
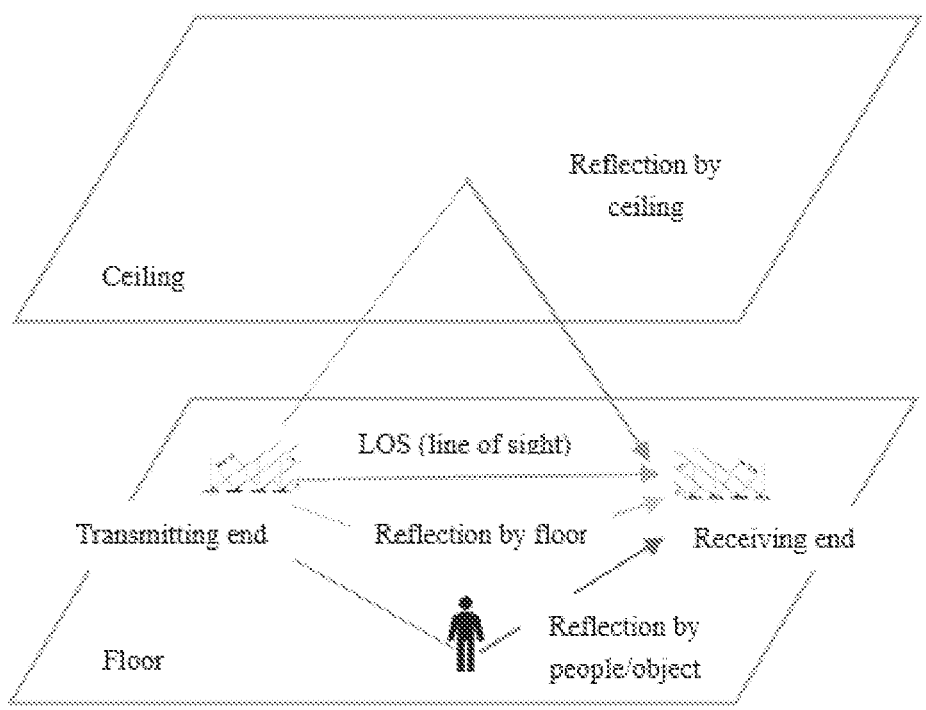
FIG. 1 shows an indoor signal propagation model during implementation of the method of the present invention.

The present invention is further described hereinafter with reference to the drawings. The following embodiments are only used to illustrate the technical solutions of the present invention more clearly, and cannot be used to limit the scope of protection of the present invention.

In an indoor non-contact human activity recognition method, one antenna array is configured for signal transmission, and the other antenna is configured for signal reception. Radio frequency reflection at different positions is calculated by the following formula:

$$S(d, \theta) = \sum_{n=1}^{N} \sum_{m=1}^{M} s_{n,t} e^{j2\pi \frac{kd}{c} t} e^{j2\pi \frac{nl\cos\theta}{\lambda}}$$

wherein, $S(d,\theta)$ is a signal of a distance d and an azimuth $\theta$, N is a number of antennas in the antenna array, M is a number of samples of radio frequency sampling, $s_{n,t}$ is a signal received by an antenna n at an $m^{th}$ sample, l is an antenna distance, $\lambda$ is a wavelength, c is a speed of light, j is an imaginary part of a complex number, and k is a slope of a radio frequency signal.

Since original data is noisy, filtration and denoising are carried out by principal component analysis. The principal component analysis (PCA) is a statistical method, which maps data to a low-dimensional space by extracting a principal component, and transforms linearly correlated variables into a set of linearly uncorrelated variables.

After data pre-processing, it is necessary to select features, and then extract and categorize the features. Frequency domain and time domain features of a signal are separated by discrete wavelet transform for feature selection. CNN is used as a feature extractor. In order to realize location-free activity recognition, a classifier should have a capability that knowledge learned from one position may be used in another position, and transfer learning may just meet this demand. In addition, an object of using as little training data as possible can be achieved by using the transfer learning. Most of network parameters are obtained from sufficient source domain data, while a small part of the network parameters is learned from target domain data.

Then, how to select a training position in an experiment is considered. After dividing a room into 25 positions, a same activity (such as sitting down) is selected to calculate a MMD (Maximum Mean Difference) distance among the positions. MMD is a most commonly used effective index in the transfer learning, and distributions between two data sets $n_1$ and $n_2$ are compared by kernel two-sample detection. Empirical estimation of MMD is as follows:

$$MMD^2(X, Y) = \left\| \frac{1}{n_1} \sum_{b=1}^{n_1} \phi(x_i) - \frac{1}{n_2} \sum_{d=1}^{n_2} \phi(y_j) \right\|_{\mathcal{H}}^2$$

wherein, $\|\cdot\|_{\mathcal{H}}^2$ represent that this distance is measured by mapping data into a reproducing kernel Hilbert space through $\phi(\ )$; $\phi$ represents that original data is mapped into a kernel function, and a Gaussian kernel is used herein; and $x_b$ and $y_d$ are $b^{th}$ data and $d^{th}$ data in $n_1$ and $n_2$ respectively, with consistent dimensions. The smaller the MMD value is, the more similar the data sets $n_1$ and $n_2$ are. A typical position for transfer learning is selected by calculating the MMD distance.

In the embodiment, the network structure of the CNN model is as follows: three convolutional layers are used, a size of a convolutional kernel in each convolutional layer is 3×3, a 2×2 pooling layer is followed by each convolutional layer, and there is a fully connected layer at the back of the network structure. The CNN is trained by minimizing a cross entropy loss:

$$H(p, q) = -\sum_x p(x) \log q(x)$$

wherein, a probability distribution p is an expected output, and a probability distribution q is an actual output. The smaller the value of H(p,q) is, the closer the actual output and the expected output are, and x represents a random variable.

In order to reduce training samples, an indoor non-contact human activity recognition method based on transfer learning is provided. The pre-trained CNN structure above aims to apply training results from first several layers of the network to other positions. Different activities have different features in the same position, but for the same activity, received signals are obviously different in different positions. Therefore, it is difficult to find a common feature, especially a statistical feature, which represents activities in all positions. It can be seen from simulation that adjacent positions have similar statistical features, which may be used for guiding selection of training positions in an experiment.

Finally, considering a number of samples for transfer learning, the recognition accuracy is changed with a number of transferred samples. If the room is divided into 25 positions, it can be seen from simulation that only three to four transfer samples are needed to reach accuracy more than 90%.

FIG. 1 shows an indoor signal propagation model during implementation of the method of the present invention.

A wireless signal may be affected by surrounding environment during propagation. Therefore, except for a human activity, there may be other environmental factors affecting the wireless signal, such as electronic devices in different frequency bands and other network communications. A health condition of a network may also affect data, such as a packet loss in the case of network congestion. When encountering an obstacle (dynamic and static) during transmission, the signal will be refracted, reflected and scattered, which will produce a multipath superimposed signal at a receiver.

Without considering effects of various obstacles, assuming that the propagation of the wireless signal may not be blocked by the obstacle to cause signal reflection, the propagation of the wireless signal may be regarded as propagation along a line-of-sight path in a free space. Considering that the signal may suffer a certain path loss during transmitting and receiving, a power $P_r(d)$ from a transmitting end to a receiving end may be represented as a formula with the distance d according to a Friis transmission equation:

$$P_r(d) = \frac{\lambda^2 P_t G_t G_r}{(4\pi)^2 d^2}$$

wherein, $P_t$ is a transmitting power; $P_r(d)$ is a receiving power, which is a function of the distance d; $G_r$ is a receiving antenna gain; $G_t$ is a transmitting antenna gain; $\lambda$ is a signal wavelength; and d is a distance between the transmitting end and the receiving end.

Generally, there are only one line-of-sight path and some paths reflected by surrounding environment, such as paths reflected by a floor, a ceiling and a wall, in wireless signal transmission paths. Considering the reflection by the ceiling and the floor, a power of the receiving end may be represented as:

$$P_r(d) = \frac{\lambda^2 P_t G_t G_r}{(4\pi)^2 (d^2 + 4h^2)}$$

wherein, $\Delta$ is a distance from the ceiling or the floor to the line-of-sight path.

However, appearance and movement of a people may also affect the wireless transmission path. Assuming that a path reflected by someone may appear when there is someone indoors, these scattered powers should also be added into a final receiving power, and then the receiving power should be represented as:

$$P_r(d) = \frac{\lambda^2 P_t G_t G_r}{(4\pi)^2 (d^2 + 4h^2 + \Delta^2)}$$

wherein, $\Delta$ is a simplified representation of a length of the path reflected by the people.

Figure 2:
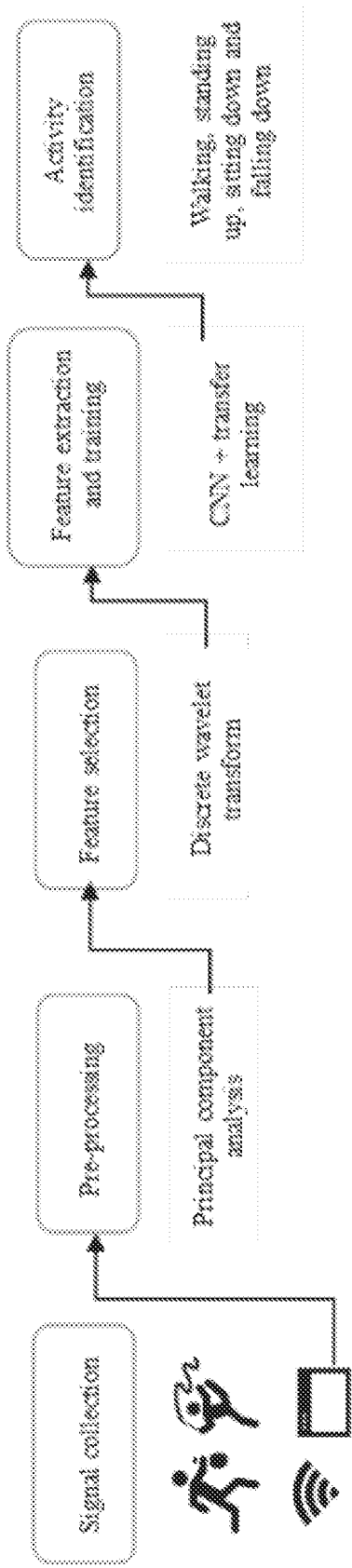
FIG. 2 is a flow chart of implementation of the method of the present invention.

FIG. 2 is a flow chart of implementation of the method of the present invention.

Step 1: Signal Collection

A signal is collected by using one antenna array to recognize a specific human activity. In a home scene, falling down of the elderly at home may be monitored in time. Meanwhile, a non-invasive environmental sensing tool is used, thus having no risk of privacy disclosure.

Figure 3:
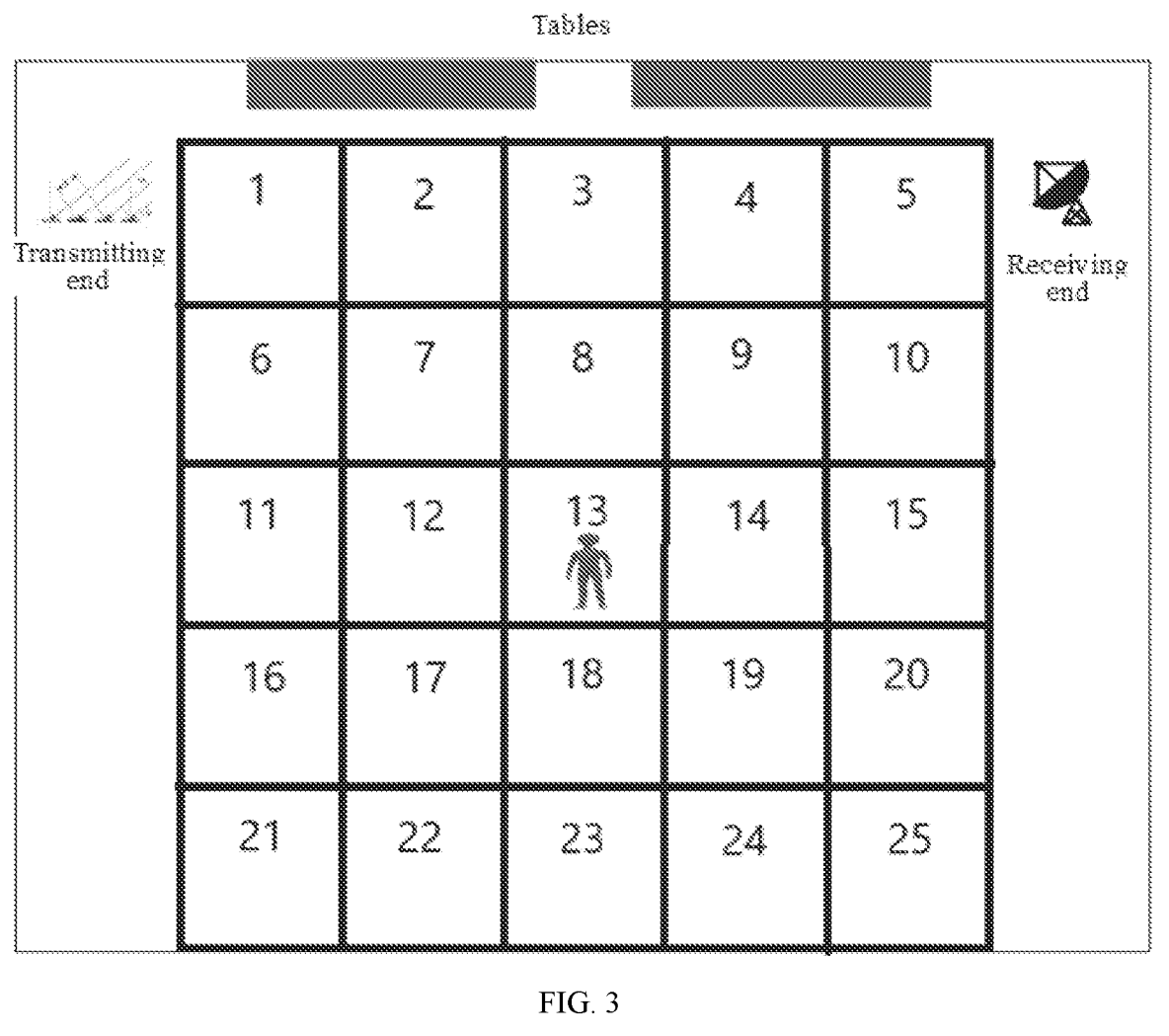

FIG. 3 is a diagram of indoor position division when the method of the present invention is implemented.

There is furniture represented by tables in a room, only two tables are drawn against a wall in the drawing, and positions of all furniture relative to the room are not changed during an experiment. The transmitting end and the receiving end are respectively arranged at two ends on a same side of the room, with a height of about 1.2 m from the ground. An area in the room is divided into 25 positions as shown in the drawing, and each position has a same area. The blue arrow represents a path of a signal reflected by a people or an object.

Step 2: Pre-Processing

Filtration is carried out by principal component analysis. The principal component analysis (PCA) is a statistical method, which maps data to a low-dimensional space by extracting a principal component, and transforms linearly correlated variables into a set of linearly uncorrelated variables. Since changes of the signal caused by a human action are related in all links, denoising can be realized by using the principal component analysis. The denoising by using the principal component analysis comprises the following steps.

(a) PCA pre-processing. Firstly, a static path part of each signal stream, which is namely a line-of-sight path part, is removed. By calculating an average value of signal amplitudes in a period of time as a constant offset, a data packet in 5 seconds is collected and an average value of signal amplitudes of the data packet is taken. Then, an original signal is cut into time slots with a length of 1 second to form a matrix H. The time length of 1 second is selected, and generally, a movement distance or an action change of a people in 1 second is very small, so that sufficient data may be collected to calculate relevant estimation.

(b) Correlation estimation. Then, a correlation matrix of a matrix $H^T \times H$ is calculated, wherein the correlation matrix is composed of correlation coefficients of the matrix, a size of the correlation matrix is N×N, and N is a number of data streams.

(c) Feature decomposition. Feature decomposition is carried out on the obtained correlation matrix, and a feature vector is obtained by calculating.

(d) Signal reconstruction. Signal reconstruction is carried out according to a formula $h_a = H \times q_a$, wherein $q_a$ is an $a^{th}$ feature vector, and $h_a$ is an $a^{th}$ principal component. That is, the original data is projected onto a feature subspace. A first principal component $h_1$ is selected herein, and the principal component is reserved for the following activity interception and feature extraction.

Step 3: Feature Selection

Considering a characteristic of each action, there are different effects on CSI data, which are represented in different aspects, such as a difference in duration, a range change and speed change of amplitude, and a difference in size. A duration and a frequency are related to an activity. The duration represents a time taken by a people to execute an action, and the frequency represents a changing speed of different signal paths caused by a body movement generated by a human activity. Different activities may have similar durations but different frequencies. For example, durations of sitting down and falling down are both relatively short, but a changing speed of a path of the falling down is significantly faster than that of the sitting down. Therefore, a power of CFR (crest factor reduction) of the falling down is higher than that of the sitting down. Similarly, different actions may have a same frequency but different durations. For example, running and the falling down have similar frequencies, but the duration of the falling down is shorter. Therefore, frequencies with different resolutions need to be extracted from different time scales to analyze a power of CFR of the human activity.

Discrete wavelet transform is often used for obtaining a time-frequency relationship of the signal, which has two main advantages: one is that there is a best resolution in a time domain and a frequency domain; and the other is that fine-grained multi-scale analysis may be realized. By the discrete wavelet transform, distributions of the signal at different frequencies may be shown, and the signal is decomposed at different decomposition scales. Level 1 represents first-level decomposition, and a low-frequency signal subjected to the first-level decomposition may be continuously decomposed to finally realize multi-level decomposition. By the discrete wavelet transform, energies of different wavelet levels are calculated according to a given signal, and each level represents a corresponding frequency range, wherein adjacent two wavelet levels are decreased exponentially. For example, if a frequency range represented by DWT of a wavelet level 1 is 150 Hz to 300 Hz, a frequency range represented by DWT of a wavelet level 2 is half that of the wavelet level 1, which is namely 75 Hz to 150 Hz. The higher the energy of the wavelet level is, the closer the changing frequency of the path affected by the action is to the range.

Denoised signals are divided into different wavelet levels, and reconstruction of several layers of signals may describe distributions of the signals on different frequency scales. These combined frequency domain and time domain features can better describe the action.

Step 4: Feature Extraction and Training

CNN has an amazing capability in feature representation. Therefore, CNN is used as a feature extractor. Consideration should be given to how to reduce a complexity and overfitting and improve accuracy.

In order to realize location-free activity recognition, a classifier should have a capability that knowledge learned from one position may be used in another position. The transfer learning may meet this demand. In addition, an object of using as little training data as possible can be achieved by fine adjustment of the transfer learning. Most of network parameters are obtained from sufficient source domain data, while a small part of the network parameters is learned from target domain data.

After designing a simple CNN network architecture, a transfer learning scheme is made based on the pre-trained CNN structure above. Functions extracted from the first several layers of the network (functions learned from some positions) are applied to other positions. A specific process is as follows. Firstly, the CNN model is trained with a training data set composed of some positions, and then optimal model parameters are obtained. Then, these updated parameters are used for initializing the network. Finally, a layer is frozen before fully connecting the layer, and then train the fully connected layer at the back of the network by using a transmission data set with only a few samples at each position. This will greatly reduce the need for training samples, and improve recognition accuracy and a convergence speed. Forward and backward propagation of CNN training is related to the whole network, while CNN transfer learning only involves the last two layers. Parameters required for the fine adjustment are obviously reduced.

Then, consideration is given to a training position and a number of samples of the transfer learning. A relationship and a distribution difference of data collected in different positions may be analyzed statistically. It can be found that for the same activity, data distributions are different in different positions. Therefore, it is difficult to find a common feature, especially a statistical feature, which represents activities in all positions. It can be seen from simulation that adjacent positions have similar statistical features, which may guide us to select training positions in an experiment.

In addition, the maximum mean difference (MMD) is used for demonstrating the data distribution difference. The same activity in all positions may be used to calculate the MMD distance. The smaller the MMD value is, the more similar the data sets $n_1$ and $n_2$ are. For samples from the same position, the MMD is smaller, while for samples from different positions, the MMD is larger. The conclusion above may also be used to guide us to select the training positions in the experiment.

During performance verification, experiments are divided into three categories according to different training data. One category is to mix data from all positions as the training sample. Another category is to use data from only some positions as the training data, but the test data is not only located in these positions. The last category is to use data from a part of positions for training the initial model, and then use a few samples from all positions for the transfer learning to realize the fine adjustment of the model. Finally, it is found that selection of three to four samples from 25 samples as the training positions can achieve a high accuracy.

Step 5: Activity Recognition

There are four actions to be recognized, which are respectively walking, standing up, sitting down and falling down. An accuracy index may be used as an evaluation standard of an activity recognition accuracy:

$$\text{Precision}(i) = \frac{TP}{TP + EP}$$

wherein TP represents that data determined as an activity i is correctly categorized as the activity i finally, and FP represents that data that is not the activity i itself is categorized as the data of the activity i. The higher the accuracy is, the higher the proportion of the correctly categorized data is.

Correspondingly, the present invention further provides an indoor non-contact human activity recognition system, which comprises:
- a collecting module configured for collecting an indoor reflected signal by using an antenna array;
- a filtering module configured for filtering the reflected signal to obtain a noise-removed reflection signal; and
- a processing module configured for inputting the noise-removed reflected signal to a pre-trained human activity recognition model, and determining a human activity category, the human activity recognition model being a pre-trained CNN network model based on a transfer learning algorithm.

Further, the filtering module is configured for filtering the reflected signal by principal component analysis to obtain the noise-removed reflection signal.

Further, the filtering module comprises:
- a division module configured for dividing an indoor activity space into a plurality of position areas, collecting a data packet of a fixed-time reflected signal of each activity in each position area, and removing a static path part in the data packet of the fixed-time reflected signal of each activity (indoor furniture and other static reflected signals corresponding to the static path part);
- a cutting module configured for cutting the data packet of the fixed-time reflected signal of each activity with the static path part removed into a plurality of time slots with a fixed time duration, and forming a matrix H corresponding to the activity according to all the time slots;
- a first calculating module configured for obtaining a covariance matrix $H^T \times H$ according to the matrix H, and calculating a correlation matrix of the covariance matrix $H^T \times H$, wherein the correlation matrix is composed of correlation coefficients of the covariance matrix, a size of the correlation matrix is N×N, and N is a number of data streams;
- a second calculating module configured for carrying out feature decomposition on the obtained correlation matrix, and calculating to obtain a feature vector; and
- a reconstruction module configured for carrying out signal reconstruction according to a formula $h_a = H \times q_a$ to obtain the noise-removed reflected signal, wherein $q_a$ is an $a^{th}$ feature vector, and $h_a$ is an $a^{th}$ principal component.

Further, the processing module comprises a model training module configured for
- acquiring a pre-built CNN model, wherein a structure of the CNN model comprises a plurality of convolutional layers, a pooling layer and one fully connected layer, the convolutional layers are sequentially connected through the pooling layer, and the last convolutional layer is connected with the fully connected layer through the pooling layer;
- determining an appropriate training position according to a conclusion that adjacent positions have similar statistical features and a result of a maximum mean difference, and acquiring the noise-removed reflected signal at the training position to form an initial training data set;
- training the CNN model with the initial training data set to obtain initial optimal model parameters;
- initializing the CNN model with the initial optimal model parameters;
- acquiring the noise-removed reflected signal at an inappropriate training position to form a secondary training data set; and
- freezing parameters of the convolutional layer and the pooling layer before the fully connected layer, and then training the fully connected layer with the secondary training data set until an upper limit of iteration times or a preset precision is reached, so as to obtain the human activity recognition model.

The present invention is extended on the basis of the combination of original device-free human activity recognition and deep learning, combines the transfer learning with CNN, and selects the training positions and the number of training samples through experiments, so that the objects of using less data and reaching high recognition accuracy are achieved, and the use of the device-free human activity recognition in daily life can be pushed forward.

It should be appreciated by those skilled in this art that the embodiment of the present application may be provided as methods, systems or computer program products. Therefore, the embodiments of the present application may take the form of complete hardware embodiments, complete software embodiments or software-hardware combined embodiments. Moreover, the embodiments of the present application may take the form of a computer program product embodied on one or more computer usable storage media (including but not limited to disk storage, CD-ROM, optical storage, etc.) in which computer usable program codes are included.

The present application is described with reference to the flow charts and/or block diagrams of the method, apparatus (system), and computer program products according to the embodiments of the present disclosure. It should be appreciated that each flow and/or block in the flow charts and/or block diagrams, and combinations of the flows and/or blocks in the flow charts and/or block diagrams may be implemented by computer program instructions. These computer program instructions may be provided to a general purpose computer, a special purpose computer, an embedded processor, or a processor of other programmable data processing apparatus to produce a machine for the instructions executed by the computer or the processor of other programmable data processing apparatus to generate a device for implementing the functions specified in one or more flows of the flow chart and/or in one or more blocks of the block diagram.

These computer program instructions may also be provided to a computer readable memory that can guide the computer or other programmable data processing apparatus to work in a given manner, so that the instructions stored in the computer readable memory generate a product including an instruction device that implements the functions specified in one or more flows of the flow chart and/or in one or more blocks of the block diagram.

These computer program instructions may also be loaded to a computer, or other programmable data processing apparatus, so that a series of operating steps are executed on the computer, or other programmable data processing apparatus to produce processing implemented by the computer, so that the instructions executed in the computer or other programmable data processing apparatus provide steps for implementing the functions specified in one or more flows of the flow chart and/or in one or more blocks of the block diagram.

The description above is merely the preferred implementations of the present invention, and it should be pointed out that those of ordinary skills in the art may further make several improvements and variations without departing from the technical principle of the present invention, and these improvements and variations should also be regarded as falling within the scope of protection of the present invention.

The invention claimed is:

1. An indoor non-contact human activity recognition method, comprising:
   collecting an indoor reflected signal by using an antenna array;
   filtering the reflected signal to obtain a noise-removed reflection signal; and
   inputting the noise-removed reflected signal to a pre-trained human activity recognition model, and determining a human activity category, the human activity recognition model being a pre-trained convolutional neural network (CNN) model based on a transfer learning algorithm;
   wherein the reflected signal is filtered by principal component analysis to obtain the noise-removed reflection signal, and the noise-removed reflected signal is inputted to the pre-trained human activity recognition model;
   wherein the filtering the reflected signal by principal component analysis comprises:
   dividing an indoor activity space into a plurality of position areas, collecting a data packet of a fixed-time reflected signal of each activity in each position area, and removing a static path part in the data packet of the fixed-time reflected signal of each activity;
   cutting the data packet of the fixed-time reflected signal of each activity with the static path part removed into a plurality of time slots with a fixed time duration, and forming a matrix H corresponding to the activity according to all the time slots;
   obtaining a covariance matrix $H^T \times H$ according to the matrix H, and calculating a correlation matrix of the covariance matrix $H^T \times H$, wherein the correlation matrix is composed of correlation coefficients of the covariance matrix, a size of the correlation matrix is N×N, and N is a number of data streams;
   carrying out feature decomposition on the obtained correlation matrix, and calculating to obtain a feature vector; and
   carrying out signal reconstruction according to a formula $h_a = H \times q_a$ to obtain the noise-removed reflected signal, wherein $q_a$ is an ath feature vector, and $h_a$ is an $a^{th}$ principal component.

2. The indoor non-contact human activity recognition method according to claim 1, wherein a training process of the human activity recognition model comprises:
   acquiring a pre-built CNN model, wherein a structure of the CNN model comprises a plurality of convolutional layers, a pooling layer and one fully connected layer, the convolutional layers are sequentially connected through the pooling layer, and the last convolutional layer is connected with the fully connected layer through the pooling layer;
   determining a training position according to a conclusion that adjacent positions have similar statistical features and a result of a maximum mean difference, and acquiring the noise-removed reflected signal at the training position to form an initial training data set;
   training the CNN model with the initial training data set to obtain initial optimal model parameters;
   initializing the CNN model with the initial optimal model parameters;
   acquiring the noise-removed reflected signal at a second training position to form a secondary training data set; and
   freezing parameters of the convolutional layer and the pooling layer before the fully connected layer, and then training the fully connected layer with the secondary training data set until an upper limit of iteration times or a preset precision is reached, so as to obtain the trained human activity recognition model.

3. An indoor non-contact human activity recognition system, comprising:
   a collecting module configured for collecting an indoor reflected signal by using an antenna array;
   a filtering module configured for filtering the reflected signal to obtain a noise-removed reflection signal; and
   a processing module configured for inputting the noise-removed reflected signal to a pre-trained human activity recognition model, and determining a human activity category, the human activity recognition model being a pre-trained convolutional neural network (CNN) model based on a transfer learning algorithm;

wherein the filtering module is configured for filtering the reflected signal by principal component analysis to obtain the noise-removed reflection signal;

wherein the filtering module comprises:

a division module configured for dividing an indoor activity space into a plurality of position areas, collecting a data packet of a fixed-time reflected signal of each activity in each position area, and removing a static path part in the data packet of the fixed-time reflected signal of each activity;

a cutting module configured for cutting the data packet of the fixed-time reflected signal of each activity with the static path part removed into a plurality of time slots with a fixed time duration, and forming a matrix H corresponding to the activity according to all the time slots;

a first calculating module configured for obtaining a covariance matrix $H^T \times H$ according to the matrix H, and calculating a correlation matrix of the covariance matrix $H^T \times H$, wherein the correlation matrix is composed of correlation coefficients of the covariance matrix, a size of the correlation matrix is N×N, and N is a number of data streams;

a second calculating module configured for carrying out feature decomposition on the obtained correlation matrix, and calculating to obtain a feature vector; and a reconstruction module configured for carrying out signal reconstruction according to a formula $h_a H \times q_a$ to obtain the noise-removed reflected signal, wherein $q_a$ is an $a^{th}$ feature vector, and $h_a$ is an $a^{th}$ principal component.

4. The indoor non-contact human activity recognition system according to claim 3, wherein the processing module comprises a model training module configured for:

acquiring a pre-built CNN model, wherein a structure of the CNN model comprises a plurality of convolutional layers, a pooling layer and one fully connected layer, the convolutional layers are sequentially connected through the pooling layer, and the last convolutional layer is connected with the fully connected layer through the pooling layer;

determining a training position according to a conclusion that adjacent positions have similar statistical features and a result of a maximum mean difference, and acquiring the noise-removed reflected signal at the training position to form an initial training data set;

training the CNN model with the initial training data set to obtain initial optimal model parameters;

initializing the CNN model with the initial optimal model parameters;

acquiring the noise-removed reflected signal at a second training position to form a secondary training data set; and freezing parameters of the convolutional layer and the pooling layer before the fully connected layer, and then training the fully connected layer with the secondary training data set until an upper limit of iteration times or a preset precision is reached, so as to obtain the trained human activity recognition model.

* * * * *